(12) United States Patent
Wickeraad (10) Patent No.: US 10,917,345 B2
(45) Date of Patent: Feb. 9, 2021

(54) GENERATING A HASH TABLE IN ACCORDANCE WITH A PREFIX LENGTH

(71) Applicant: Hewlett Packard Enterprise Development LP, Houston, TX (US)

(72) Inventor: John A. Wickeraad, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 41 days.

(21) Appl. No.: 15/745,448

(22) PCT Filed: Jul. 17, 2015

(86) PCT No.: PCT/US2015/040941
§ 371 (c)(1),
(2) Date: Jan. 17, 2018

(87) PCT Pub. No.: WO2017/014726
PCT Pub. Date: Jan. 26, 2017

(65) Prior Publication Data
US 2018/0219778 A1    Aug. 2, 2018

(51) Int. Cl.
*H04L 12/743* (2013.01)
*H04L 12/741* (2013.01)
*H04L 12/745* (2013.01)

(52) U.S. Cl.
CPC .......... *H04L 45/7453* (2013.01); *H04L 45/54* (2013.01); *H04L 45/748* (2013.01); *H04L 45/7457* (2013.01)

(58) Field of Classification Search
None
See application file for complete search history.

(56) References Cited

U.S. PATENT DOCUMENTS

| | | | |
|---|---|---|---|
| 7,089,240 B2 | 8/2006 | Basso et al. | |
| 7,289,979 B2 | 10/2007 | Wilson | |
| 7,443,841 B2 | 10/2008 | Davis | |
| 9,270,592 B1* | 2/2016 | Sites | H04L 45/745 |
| 2004/0255045 A1 | 12/2004 | Lim et al. | |
| 2005/0114393 A1* | 5/2005 | Wilson | H04L 45/00 |
| 2005/0141519 A1* | 6/2005 | Rajgopal | H04L 45/00 370/395.32 |
| 2006/0253606 A1 | 11/2006 | Okuno | |

(Continued)

FOREIGN PATENT DOCUMENTS

WO    WO-2010/145295 A1    12/2010

OTHER PUBLICATIONS

Hsiao Yi-Mao et al: "A high-throughput and high-capacity IPv6 routing lookup system", Computer Networks, Elsevier, Amsterdam NL, pp. 1-13 Retrieved from ESSR dated Oct. 2, 2018.

(Continued)

*Primary Examiner* — Jenkey Van
(74) *Attorney, Agent, or Firm* — Hewlett Packard Enterprise Patent Department (57) ABSTRACT

Examples herein disclose a generation of a hash table. The examples identify a prefix length from a routing table of various prefix lengths and corresponding distribution of entries. The identified prefix length corresponds to a larger distribution of entries in the routing table. The examples generate the hash table in accordance with the identified prefix length.

12 Claims, 6 Drawing Sheets

(56) References Cited

U.S. PATENT DOCUMENTS

| | | | |
|---|---|---|---|
| 2008/0112413 A1 | 5/2008 | Pong | |
| 2010/0023727 A1 | 1/2010 | Lim | |
| 2011/0283061 A1* | 11/2011 | Reddy | G11C 15/00 |
| | | | 711/108 |
| 2014/0064276 A1* | 3/2014 | Basso | H04L 45/7453 |
| | | | 370/392 |
| 2014/0122791 A1* | 5/2014 | Fingerhut | H04L 49/00 |
| | | | 711/108 |
| 2015/0098470 A1* | 4/2015 | Sun | H04L 45/748 |
| | | | 370/392 |
| 2016/0014028 A1* | 1/2016 | He | H04L 45/745 |
| | | | 370/392 |
| 2017/0366502 A1* | 12/2017 | Kravchik | H04L 45/74 |

OTHER PUBLICATIONS

Srinivasan V et al: "Fast address lookups using controlled prefix expansion", ACM Transactions on Computer Systems (TOCS), Association for Computing Machineryy, Inc, US, pp. 1-40, Retrieved from the ESSR dated Oct. 2, 2018.

International Searching Authority, The International Search Report and the Written Opinion, dated Apr. 14, 2016, PCT/US2015/040941, 11 Pgs.

S.M. Yong and H.T. Ewe, "Robust Routing Table Design for IPv6 Lookup," ICITA'05, 2005, pp. 1-6, IEEE.

* cited by examiner

GENERATING A HASH TABLE IN ACCORDANCE WITH A PREFIX LENGTH

BACKGROUND

A routing table is a data table on a networking device which lists the routes and appropriate destinations for a data packet. The networking device uses the routing table to perform an address lookup operation to determine the next appropriate destination.

BRIEF DESCRIPTION OF THE DRAWINGS

In the accompanying drawings, like numerals refer to like components or blocks. The following detailed description references the drawings, wherein.

DETAILED DESCRIPTION

A routing table may include multiple prefix lengths which each correspond to a destination subnet for delivering a data packet. To do determine the destination subnet, a networking device may perform an Internet Protocol (IP) address lookup operation on the routing table. As the Internet has continued to increase, the number of routes in which to forward the data packets has also increased thus increasing a size of the routing table. The increased size of the routing table may affect how quickly and effectively the networking device may perform the IP address lookup operation.

As the routing tables have increased in size, various mechanisms have been provided to implement the routing table. For example, a tree search algorithm may be utilized to perform the address lookup to determine the appropriate destination for incoming data packets. In the tree search algorithm, prefixes of the routing table are stored in a tree bitmap data structure that is searched from a longest prefix length to a shortest prefix length. This is inefficient and may contribute to latency and/or cause a bottleneck. Another implementation employs a ternary content addressable memory (TCAM) to store the routing table. The TCAM is a type of memory consisting of a bit comparator and two memory elements, one of storing data and the other storing a compare mask. Using the routing table in TCAM, searches may be done every cycle increasing search performance. However, TCAMs have become costly to store large routing tables. Storing additional bits with the data value increases the memory space and power consumption making the TCAM less efficient for storing large routing tables.

To address the above-referenced issues, some examples provide a mechanism for a networking device optimize the address lookup operation. The examples build a hash table based on a statistically popular prefix lengths. The examples identify a prefix length from a routing table of various prefix lengths and corresponding distribution of address entries. The identified prefix length corresponds to a larger distribution of address entries for building the hash table. The distribution of address entries represent a number or amount of routes associated with each prefix length. The larger the number or amount indicates the more popular the prefix length. Thus, the examples build the hash table based on the popularity of the prefix length. Using the hash table creates a more space and power efficient mechanism as fewer functional bits are stored with each cell. Additionally building the hash table out of the more popular prefix length decreases the physical size of the routing table and increases the efficiency of the address lookup operation.

In one example, the networking device may store the hash table in a random access memory (RAM). Storing the hash table in the RAM enables the hash table search to be performed prior to searching the remainder of the routing table which may be stored in the TCAM. Searching the hash table first increases the chances to quickly determine the best match prefix in which to forward the packet.

In another example, the networking device stores the original routing table without the identified prefix length and the corresponding distribution of address entries. The corresponding distribution of address entries includes a set of addresses which are excluded from the routing table. This modified routing table may be stored in the TCAM thus reducing the overall physical size of the routing table.

Figure 1:
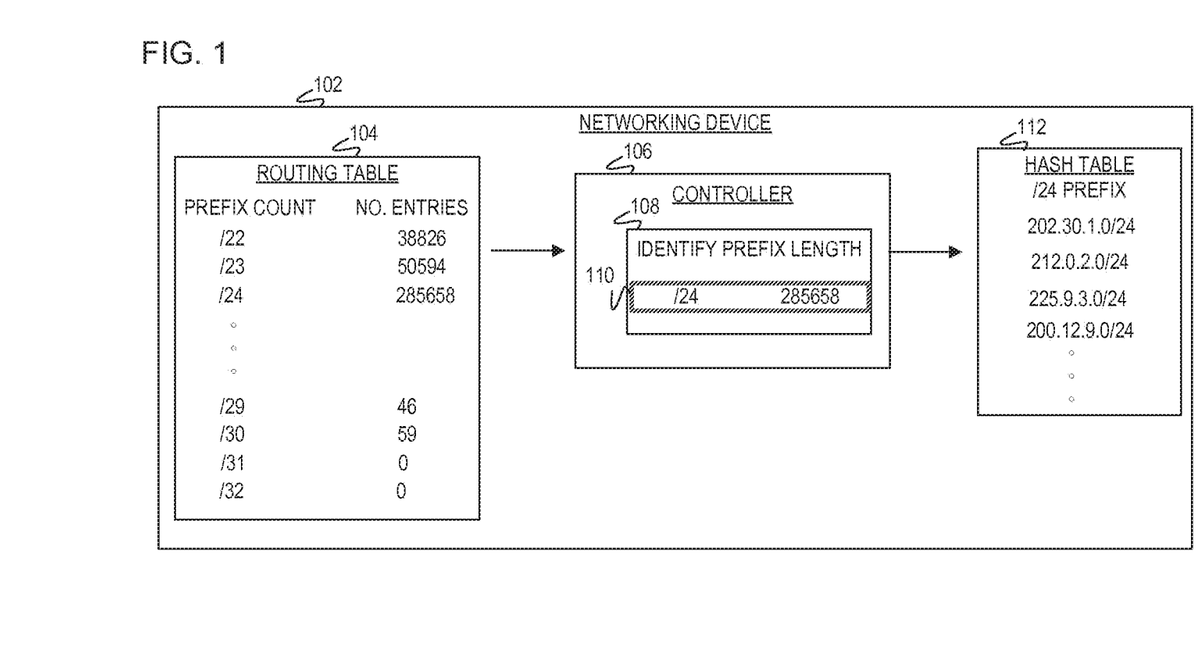
FIG. 1 is a block diagram of an example networking device to build a hash table of an identified prefix length.

FIG. 1 is a block diagram of an example networking device 102 including a controller 106 to identify a prefix length 110 from a routing table 104 of various prefix lengths. The controller 106 identifies the prefix length 110 at module 108 by selecting the prefix length with a larger distribution of entries. Based on identifying the prefix length 110 at module 108, the controller 106 generates a hash table 112 by grouping together those address entries which correspond to the identified prefix length 110. FIG. 1 illustrates a networking system in which networked computing devices, such as the networking device 102 may exchange data in the form of data packets. These networked computing devices establish data connections in the form on networking links to route and/or forward the data packets. As such, implementations of the networking system include, by way of example, a telecommunications network, Internet, Ethernet, wide area network (WAN, local area network (LAN), optic cable network, virtual network or other type of networking system to route data packets, accordingly. Although FIG. 1 illustrates components specific to the networking device 102, not all of the depicted components may be required. Implementations may include additional components not shown in the figures. For example, FIG. 1 may additionally include a ternary content addressable memory (TCAM). Thus, variations in the arrangement and type of the components may be made without departing from the scope of the claims as set forth herein.

The networking device 102 is a networking component that receives incoming data packets and performs lookup operations to route the incoming data packets to the appropriate destinations. Implementations of the networking device 102 include, by way of example, a networking switch, router, virtual networking component, or other type of networking device 102 which routes data packets to the appropriate destinations.

The routing table 104 includes the various prefix lengths (e.g., /22, /23, /24, /29, /30, /31, and /32) and the corresponding distribution of entries for each prefix length. The routing table 104 is a data table obtained by the networking device 102 that specifies a route for an incoming packet to a particular network destination. As such, the networking device 102 references the routing table to perform an Internet Protocol (IP) address lookup to determine the destination address of an incoming data packet. The various prefix lengths represent a number of set bits within a subnet mask. For example, there would be 24 1's in a binary version of a /24 prefix length. Although FIG. 1 illustrates a range of the various prefix lengths including /22-724 and /29-/32, implementations should not be limited as the range may include additional prefix lengths. For example, the range of prefix lengths may include the prefix lengths from /8-/32.

Each of the various prefix lengths from the routing table 104 include a corresponding distribution of address entries. The corresponding distribution of address entries represent a number or amount of routes with each prefix length. The larger the distribution of address entries indicates the more popular the prefix length. For example, the prefix count lengths including /22-/23 prefix count lengths include the larger amount of address entries rather than the /29-/32 prefix lengths. Accordingly, these prefix lengths (/22-/24) each represent the more popular prefix length. Referencing the routing table 104, the controller 106 can identify the prefix length 110 which includes the larger distribution (e.g., amount) of address entries.

The controller 106 uses the routing table 104 to identify the prefix length 110 at module 108. The identified prefix length 110 is the prefix length with the corresponding greater or larger number of distribution entries. In this example, the prefix length /24 corresponds to the greatest or largest number of distribution entries (285658). This identified prefix length 110 is identified for generating the hash table 112 with the specified address entries. Identifying the prefix length 110 for generating the hash table 112 enables the routing table 104 to be separated out into individual prefix lengths. The module 108 may include, by way of example, instructions (e.g., stored on a machine-readable medium) that, when executed (e.g., by the controller 106) implement the functionality of module 108. Alternatively, or in addition, the module 108 may include electronic circuitry (i.e., hardware) that implements the functionality of module 108. The controller 106 may include, by way of example, a microcontroller, integrated circuit, processing device, semiconductor, circuit, or other type of hardware component for identifying the prefix length 110 among the various prefix lengths.

The identified prefix length 110 is identified as the particular prefix length among the various prefix lengths that corresponds to the larger distribution of entries. The prefix length is identified as the prefix length in which to construct the hash table 112.

The hash table 112 is a data structure in which the controller may perform the lookup operation to determine an IP address of where to route the incoming packet(s). The hash table 112 is used to implement the IP address entries. As such, the controller 106 may compute a hash function (not illustrated) to compute the IP address entries. In this figure, the hash table 112 is generated by grouping together those address entries which correspond to the identified prefix length 110. In this example, the /24 prefix length includes 285,658 entries. The 285,658 represents the number of IP address routes in which to forward the packet as illustrated in the hash table 112. The hash table 112 includes the actual IP address routes associated with the identified prefix length 110. In other implementations, the hash table 112 is created by the appropriate number of entries to support the identified prefix length 110. In this implementation, the hash table 112 is created to support the 285,658 entries. If the hash table 112 does not include the appropriate number of entries, overflow entries are stored in a TCAM.

Figure 2:
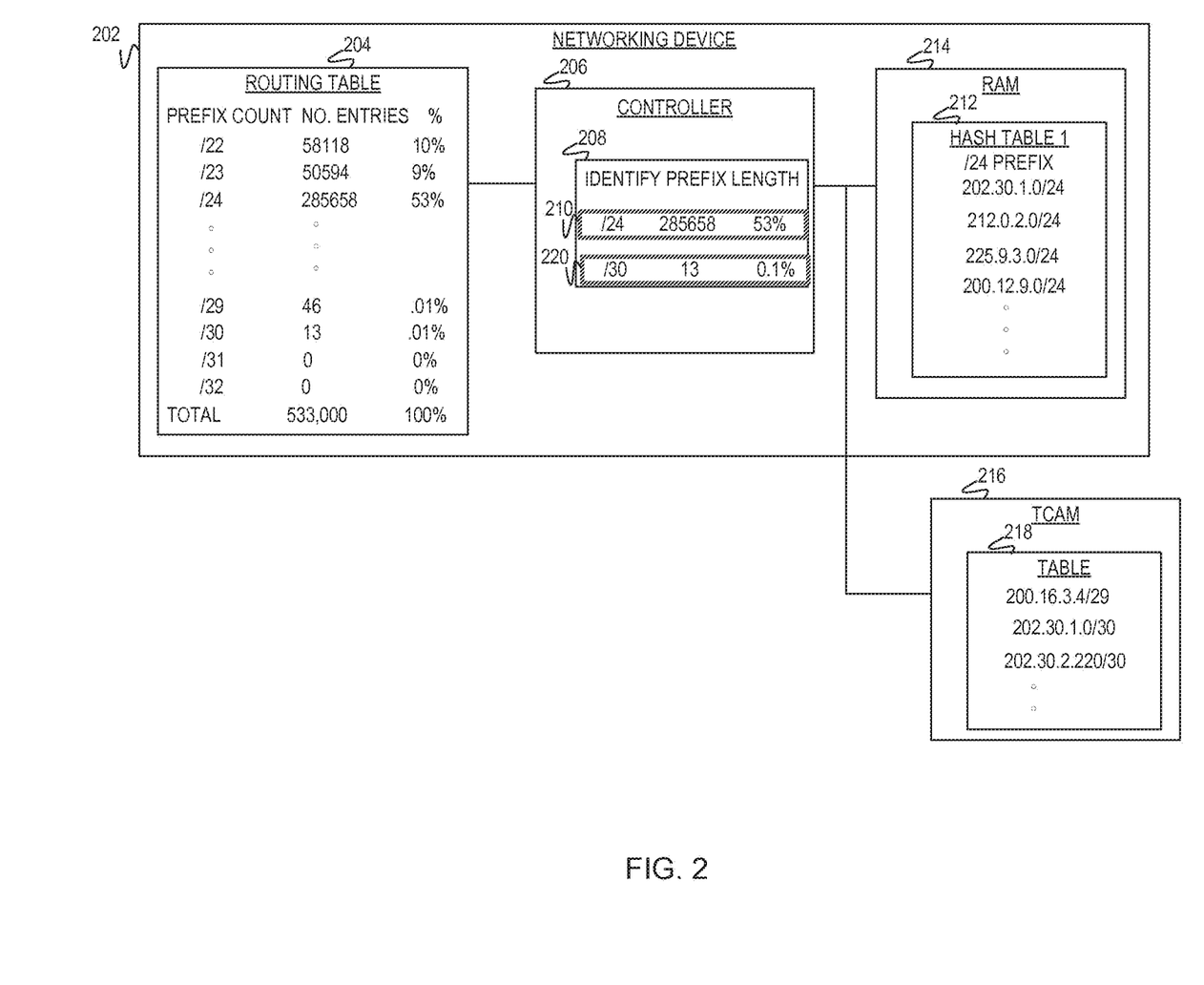
FIG. 2 is a block diagram of an example networking device to build a hash table and a different table for storage in a random access memory (RAM) and a ternary content addressable memory (TCAM)

FIG. 2 is a block diagram of an example networking device 202 including a controller 206 to build a hash tables 212 and table 218 from a routing table 204 for storage in a random access memory (RAM) 214 and a ternary content addressable memory (TCAM) 216. The hash table 212 is representative of an identified prefix length 210 corresponding to a larger distribution of address entries. The table 218 is representative of the original routing table (without the popular prefix length). As such, the table 218 may include one or multiple different prefix lengths 220. For example as illustrated in FIG. 2, the table 218 may include the /29 and the /30 prefix lengths. These prefix lengths correspond to a smaller distribution sets of addresses compared to the other prefix lengths (/22-/24). Each table 212 and 218 holds the routes or sets of address entries corresponding to the respective prefix lengths 210 and 220. Although FIG. 2 illustrates components specific to the networking device 102, implementations should not be limited as additional components may not be shown in the figures. For example, FIG. 2 may additionally include a machine-readable storage medium as in FIGS. 5-6. Thus, variations in the arrangement and type of the components may be made without departing from the scope of the claims as set forth herein.

The routing table 204 includes the various prefix lengths and corresponding distribution of address entries. In addition to the corresponding distribution address entries, the routing table includes a percentage of each of the various prefix lengths. The percentage is a ratio of the distribution of address entries for each prefix length over a total number of address entries. For example, for the /24 prefix length there may be 285,658 corresponding address entries and a total number of address entries of 533,000. Thus the ratio would be 285,658/533,000 which would round out to around 53% of the address entries. The greater or larger the distribution of the address entries, means a higher percentage rate. The higher the percentage rate indicates the more popular prefix length for generating the hash table 212. In turn, the lower the percentage rate indicates a less popular prefix length for building the table 218 for storage in the TCAM 216.

At module 208, the controller 206 identifies the prefix length 210 corresponding to the larger distribution of address entries to build hash table 212. The controller 206 also identifies a different prefix length 220 which corresponds to the smaller distribution of address entries. The distribution of address entries includes an amount or number of IP addresses which correspond to different prefix lengths. The concept of larger and smaller distributions are relative terms which may be dependent on how many total address entries are within the routing table 204. For example, if there are 10,000 total address entries a larger distribution may include only a few thousand entries. In other implementations, if there is a pre-defined number of hash tables for storage in RAM, the controller 206 will identify the most popular (e.g., larger distributions) in which to build separate pre-defined hash tables.

The RAM 214 is considered an internal memory which stores the routes (i.e., IP addresses) corresponding to the identified prefix length 210 in the hash table 212. Storing the tables 212 and 218, the controller 206 may simultaneously or serially check the RAM 214 and TCAM 216 for the longest prefix match.

The TCAM 216 adds a type of content addressable memory which allows for a mask bit to each memory cell. Using the TCAM 216 takes more memory and space than RAM 214 as each memory cell must encode multiple possible states, unlike RAM. The TCAM 216 stores the table 218 which allows accommodation of those prefix lengths which include smaller distribution address of entries. For example, the prefix length may be /30 with around 13 address entries and makes up around 0.01% of the total number of address entries. In the example, the 0.01% indicates the /31 prefix length is less popular than other prefix lengths such as the /22-/24 prefix length. Thus, since the /31 prefix length is less popular with fewer address entries, the table 218 with the corresponding address entries is placed by the controller 206 into the TCAM 216.

The table 218 is representative of the original routing table 204 but without those prefix lengths and corresponding address entries identified to build hash table 212. For example, the table 218 may prefix lengths /22-/23 and /29-132. Including the prefix length(s), the table 218 also includes the sets of address entries which corresponding to each of the prefix length(s).

Figure 3:
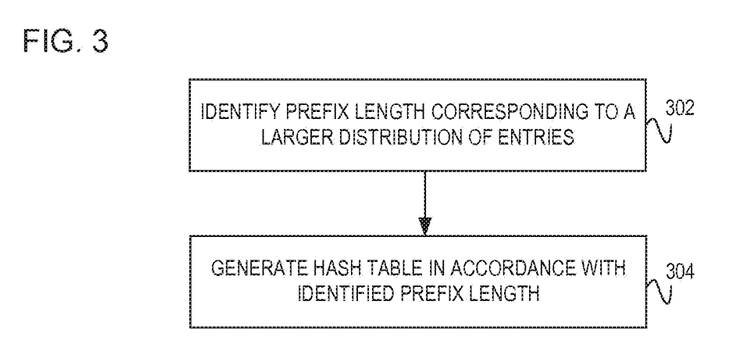
FIG. 3 is a flowchart of an example method to generate a hash table based on an identified prefix length.
Figure 4:
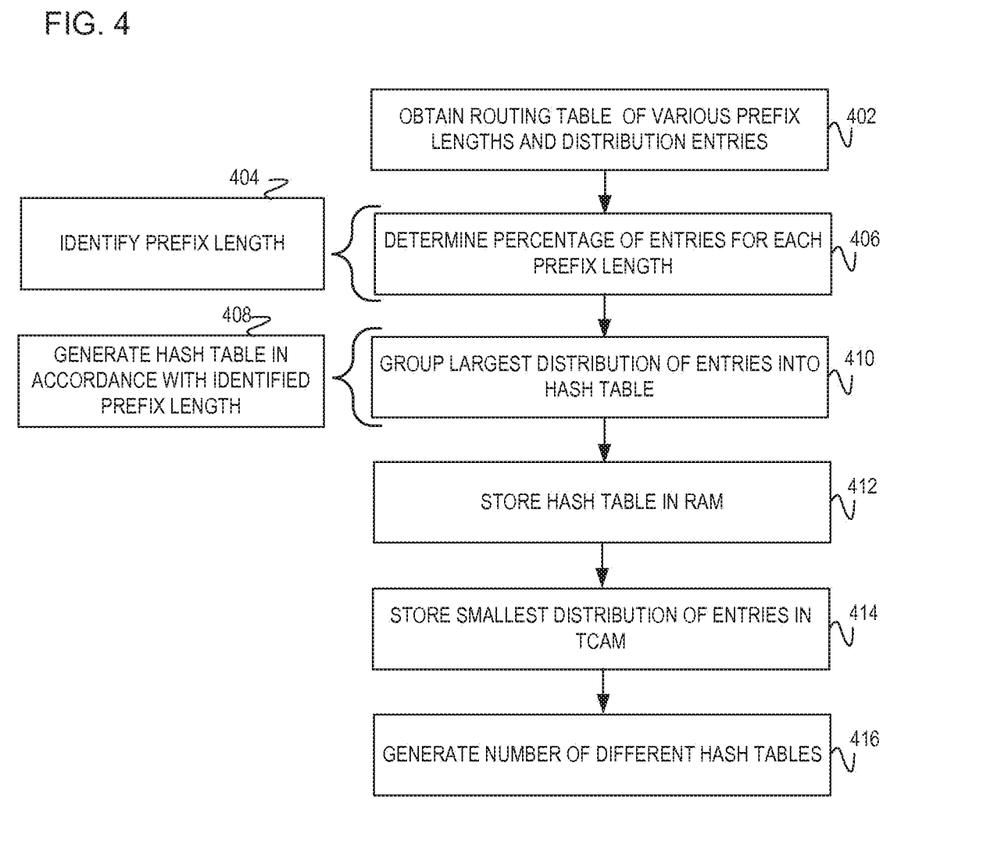
FIG. 4 is a flowchart of an example method to generate a hash table by grouping a larger distribution of entries corresponding to an identified prefix length.

Referring now to FIGS. 3 and 4, flowcharts are illustrated in accordance with various examples of the present disclosure. The flowcharts represent processes that may be utilized in conjunction with various systems and devices as discussed with reference to the preceding figures. While illustrated in a particular order, the flowcharts are not intended to be so limited. Rather, it is expressly contemplated that various processes may occur in different orders and/or simultaneously with other processes than those illustrated.

FIG. 3 illustrates a flowchart of an example method to generate a hash table based on an identified prefix length. The method is executable by a networking device to identify a prefix length from a routing table. The routing table includes various prefix lengths and corresponding distribution of entries. The corresponding distribution of entries include how many address entries have been assigned to the various prefix lengths. The identified prefix length is considered the prefix length which has been assigned a larger number of entries. Identifying the prefix length from the routing table, the networking device generates the hash table. The hash table includes those address entries which correspond to identified prefix length. In discussing FIG. 3, references may be made to the components in FIGS. 1-2 to provide contextual examples. In one implementation, the networking device 102 executes operations 302-304 to generate the hash table. Although FIG. 3 is described as implemented by the networking device 102, it may be executed on other suitable components. For example, FIG. 3 may be implemented in the form of executable instructions on a machine-readable storage medium 504 and 604 as in FIGS. 5-6.

At operation 302, the networking device identifies the prefix length from the routing table. The routing table includes various prefix lengths which represent the addresses to destinations for forwarding a data packet. The routing table may be obtained from an adjacent router through various protocols, such as routing information protocol (RIPv1, RIPv2), Open Shortest Path Bridging (OSPF), Border Gateway Protocol (BGP), Intermediate System to Intermediate System (ISIS), Exterior Gateway Protocol (EGP), Enhanced Interior Gateway Routing Protocol (EI-GRP), etc. The routing table includes statistics on the public domain from the adjacent router. These statistics may change and evolve as the Internet grows. For example, the address entries may tend to shift to longer prefix lengths over time and thus the overall distribution of the address entries may slowly change. This indicates the address entries may increase in prefix length and slowly change in popularity. Thus, the routing table includes the various prefix lengths and the corresponding distribution of the address entries. The prefix length is defined as the number of set bits (1's from the total number of bits in a subnet mask. For example, if the subnet mask is 255.255.255.0, there are 24 1's in the binary version of the subnet mask. So the prefix length count in this example would be /24. Each prefix length includes the amount (e.g., distribution) of address entries corresponding to that prefix length. The prefix length with the larger number of address entries is identified. In implementations, the identified prefix length is the length with the largest number of address entries. Identifying the prefix length corresponding to the larger number of address entries, the networking device identifies the more popular prefix length.

At operation 304, the networking device generates the hash table in accordance with the identified prefix length. Multiple hash tables may be created for the prefix lengths which are considered the most popular prefix lengths. For example, a network administrator may predefine a number of the hash tables. The networking device identifies those prefix lengths are the most popular prefix lengths, so the hash table may be generated for each of the most popular prefix lengths.

As such, at operation 304, the networking device identifies the prefix length which is more popular by determining which prefix length includes the larger distribution of address entries. The address entries are those routes with the identified prefix length include a greater number of addresses. In this manner, the greater number of routes corresponding to the prefix length are selected for placement into the hash table. The larger distribution of address entries corresponding to the identified prefix length are placed into the hash table. This enables the networking device to choose or create the hash table with the appropriate number of entries to support the identified prefix length. In keeping with the previous example, assume the /24 prefix length included the largest number of entries (e.g., 285,658). The /2/1 prefix length and the 300,000 address entries would be combined into the hash table. Upon developing this hash table, the networking device stores the hash table in RAM. In a further implementation, a non-identified prefix length corresponding to a smaller distribution of address entries is place in a TCAM.

FIG. 4 is a flowchart of an example method to generate a hash table by grouping together a distribution of entries corresponding to an identified prefix length. The method is executable by a networking device to generate the hash table. In discussing FIG. 4, references may be made to the components in FIGS. 1-2 to provide contextual examples. In one implementation, the networking device 102 executes operations 402-416 to generate the hash table. Although FIG. 4 is described as implemented by the networking device 102, it may be executed on other suitable components. For example, FIG. 4 may be implemented in the form of executable instructions on a machine-readable storage medium 504 and 604 as in FIGS. 5-6.

At operation 402, the networking device obtains the routing table of various prefix lengths and corresponding distribution of address entries. The routing table may be obtained from an adjacent router which includes statistics from the public domain. As indicated in connection with the previous figure, the routing table may be obtained from the adjacent router through various protocols including RIPv1, RIPv2, OSPF, BGP, ISIS, EGP, EIGRP, etc. The corresponding distribution of address entries include a number of IP addresses per prefix length. The networking device may proceed to identify that prefix length which includes a larger number of IP addresses indicating it is a more popular prefix length.

At operation 404, the networking device identifies the prefix length among the various multiple lengths in the routing table. The prefix length is identified by determining which prefix length includes a larger number of IP address entries. This enables the networking device to split up the identified prefix length from the routing table into its own hash table. In one implementation, the networking device identifies the prefix length by determining a percentage of entries for each of the prefix lengths as at operation 406.

At operation 406, the networking device determines the percentage for each of the various prefix lengths. The percentage is expressed as a ratio of the number of address entries for that prefix length over the total number of address entries. The percentage represents the popularity of each of the various prefix lengths. For example, the higher the percentage indicates the more popular prefix length and thus would be identified for generating hash table separate from the routing table.

At operation 408, the networking device generates the hash table for the identified prefix length. The networking device may include determining the hash function values which correspond to each entry. In one implementation to generate the hash table, the networking device groups together those address entries which correspond to the prefix length as at operation 410.

At operation 410, the networking device groups the address entries corresponding to the identified prefix length into the hash table. Grouping together the address entries corresponding to the identified prefix length, enables the networking device to create the hash table with the appropriate number of entries to support the address entries. In another implementation, if the hash table does not include the appropriate number of entries to support the address entries, the overflow address entries are stored in a TCAM.

At operation 412, the networking device stores the hash table generated at operation 408 into RAM. Storing the hash table in RAM, the networking device may reference to perform a lookup operation.

At operation 414, the networking device stores one of the smaller distribution of address entries corresponding to a different prefix length (e.g., prefix length other than the identified prefix length). In this implementation, the non-popular prefix length(s) are placed in TCAM. In implementations, the networking device simultaneously or serially check the TCAM and RAM for the lookup operations. In another implementation, the networking device stores the original routing table without the identified prefix length and the corresponding address entries. This decreases the size of the routing table.

At operation 416, the networking device generates a number of different hash tables based on a pre-defined number of hash tables. These different hash tables may correspond to different distribution of entries in the routing table. For example, assume an administrator defines using five different hash tables. The top five most popular prefix lengths are identified to generate a different hash table with the corresponding address entries.

Figure 5:
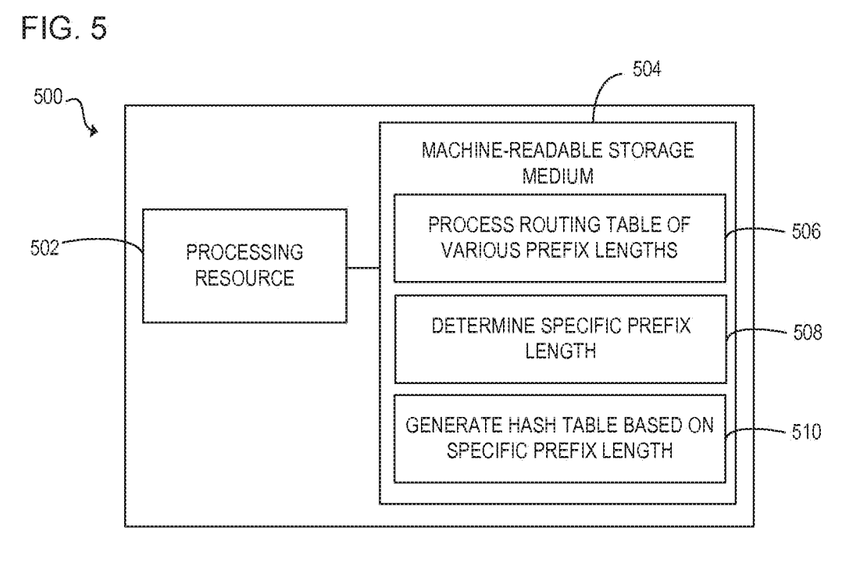
FIG. 5 is a block diagram of an example computing device with a processing resource to execute instructions in a machine-readable storage medium for generating a hash table based on a specific prefix length as determined from a routing table.

FIG. 5 is a block diagram of computing device 500 with a processing resource 502 to execute instructions 506-510 within a machine-readable storage medium 504. Specifically, the computing device 500 with the processing resource 502 is to generate a hash table based on a specific prefix length. The specific prefix length is identified as the prefix length which corresponds to a larger distribution of entries. Although the computing device 500 includes processing resource 502 and machine-readable storage medium 504, it may also include other components that would be suitable to one skilled in the art. For example, the computing device 500 may include the controller 106 as in FIG. 1. The computing device 500 is an electronic device with the processing resource 502 capable of executing instructions 506-510, and as such embodiments of the computing device 500 include a mobile device, client device, personal computer, desktop computer, laptop, tablet, video game console, or other type of electronic device capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 to generate the hash table based on the specific prefix length. Specifically, the processing resource 502 executes instructions 506-510 to: process a routing table of various prefix lengths; determine the specific prefix length from the routing table of various prefix lengths, the specific prefix length is determined by identifying the prefix length which corresponds to a larger distribution of address entries within the routing table; generate the hash table once the specific prefix length is identified. The hash table may be generated by grouping together the larger distribution of address entries identified from the specific prefix length.

The machine-readable storage medium 504 includes instructions 506-510 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the computing device 500.

Figure 6:
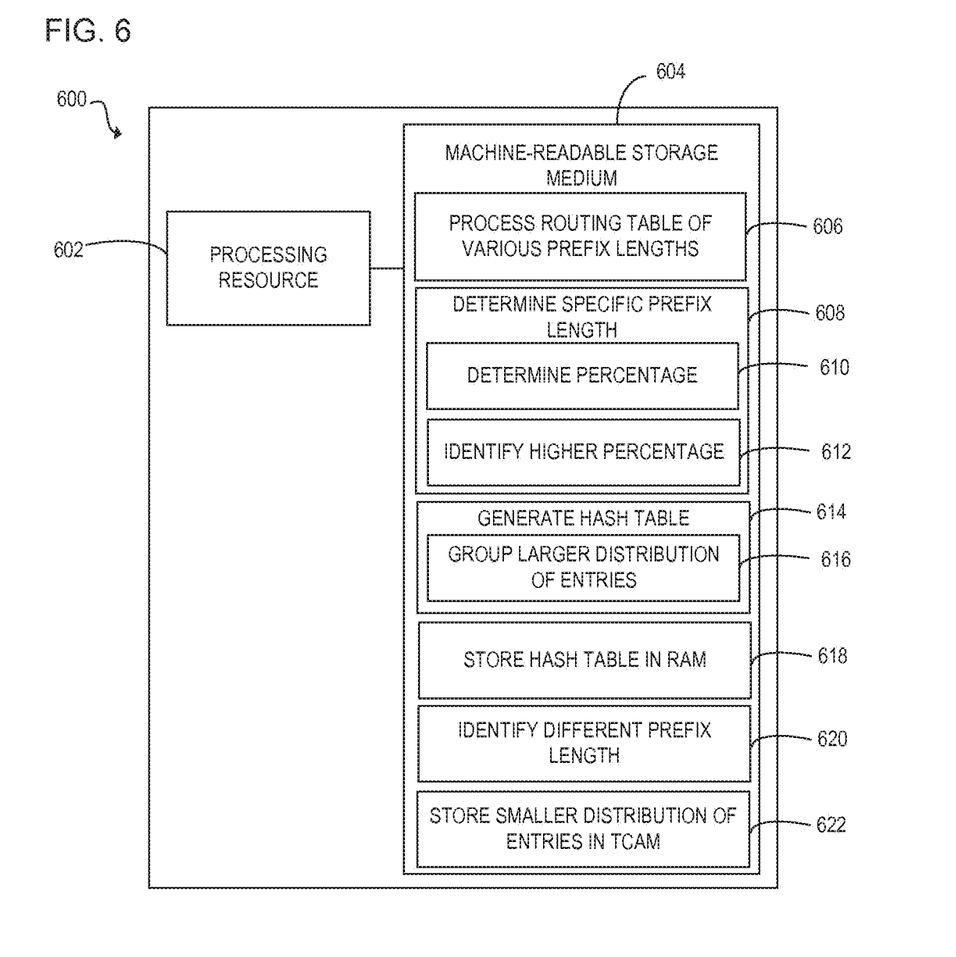
FIG. 6 is a block diagram of an example computing device with a processing resource to execute instructions in a machine-readable storage medium for generating and storing a hash table.

FIG. 6 is a block diagram of computing device 600 with a processing resource 602 to execute instructions 606-622 within a machine-readable storage medium 604. Specifically, the computing device 600 with the processing resource 602 to determine a specific prefix length from a routing table of various prefix lengths. The routing table includes a distribution of entries for each of the various prefix lengths. Using the distribution of entries, a percentage is calculated for each of the various prefix lengths. The higher the percentage is identified as the specific prefix length. The specific prefix length is the length in which to generate the hash table which includes the entries corresponding to the specific prefix length. Although the computing device 600 includes processing resource 602 and machine-readable storage medium 604, it may also include other components that would be suitable to one skilled in the art. For example, the computing device 600 may include the controller 106 as in FIG. 1. The computing device 600 is an electronic device with the processing resource 602 capable of executing instructions 606-622, and as such embodiments of the computing device 600 include a mobile device, client device, personal computer, desktop computer, laptop, tablet, video game console, or other type of electronic device capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-622 to generate the hash table by grouping the larger distribution of address entries corresponding to the identified prefix length. The hash table with the larger distribution of entries may be stored in RAM while the smaller distribution of entries may be stored in the TCAM. Specifically, the processing resource 602 executes instructions 606-622 to: process the routing table of various prefix lengths; determine a specific prefix length from the routing table of various prefix lengths by determining a percentage for each of the prefix lengths; determine the percentage for each of the various prefix lengths in the routing table, the percentage is calculated by determine the amount of distribution entries for each prefix length over the total number of distribution entries from the routing table; identify the specific prefix length corresponding to the higher percentage, the greater the percentage indicates the greater number of entries from the total number of entries; generate the hash table by grouping together the larger distribution of entries which correspond to the specific prefix length; store the hash table in RAM; identify a different prefix length from the routing table which corresponds to the smaller distribution or amount of address entries in the routing table; and store the smaller distribution of address entries in the TCAM.

The machine-readable storage medium 604 includes instructions 606-622 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A networking device comprising:
   a processor;
   a storage device coupled to the processor and storing instructions which when executed by the processor cause the processor to perform a method, the method comprising:
   obtaining a routing table comprising a plurality of prefix lengths, wherein a respective entry in the routing table specifies a prefix length and a distribution of address entries corresponding to the specified prefix length;
   determining a number of hash tables predefined by an administrator;
   identifying, from the plurality of prefix lengths in the routing table, a subset of prefix lengths having highest distributions of address entries based on the predefined number of hash tables, wherein a number of identified prefix lengths in the subset equals the number of predefined hash tables; and;
   generating a set of hash tables in accordance with the identified subset of prefix lengths with each hash table generated for an identified prefix length in the subset, wherein generating a hash table for an identified prefix length comprises allocating a number of hash table entries that support a total number of address entries corresponding to the identified prefix length;
   storing the generated set of hash tables in a random access memory (RAM);
   modifying the routing table by removing address entries corresponding to the identified subset of prefix lengths from the routing table; and
   storing the modified routing table in a ternary content address memory (TCAM).

2. The networking device of claim 1, wherein generating a hash table in accordance with an identified prefix length comprises:
   grouping entries corresponding to the identified prefix length from the routing table into the hash table.

3. The networking device of claim 1, wherein the distribution of address entries corresponding to the specified prefix length comprises a percentage value.

4. The networking device of claim 1, wherein the method further comprises searching the hash table prior to searching the modified routing table.

5. A method, executable by a networking device, the method comprising:
   obtaining a routing table comprising a plurality of prefix lengths, wherein a respective entry in the routing table specifies a prefix length and a distribution of address entries corresponding to the specified prefix length;
   determining a number of hash tables predefined by an administrator;
   identifying, from the plurality of prefix lengths in the routing table, a subset of prefix lengths having highest distributions of address entries based on the predefined number of hash tables, wherein a number of identified prefix lengths in the subset equals the number of predefined hash tables;

generating a set of hash tables in accordance with the identified subset of prefix lengths with each hash table generated for an identified prefix length in the subset, wherein generating a hash table specific to an identified prefix length comprises allocating a number of hash table entries that support a total number of address entries corresponding to the identified prefix length;

storing the generated set of hash tables in a random access memory;

modifying the routing table by removing address entries corresponding to the identified subset of prefix lengths from the routing table; and storing the modified routing table in a ternary content address memory (TCAM).

6. The method of claim 5, wherein generating a hash table specific to an identified prefix length comprises:

grouping entries corresponding to the identified prefix length from the routing table into the hash table.

7. The method of claim 5, wherein the distribution of address entries corresponding to the specified prefix length comprises a percentage value.

8. The method of claim 5, further comprising searching the hash table prior to searching the modified routing table.

9. A non-transitory machine-readable storage medium comprising instructions that when executed by a processing resource cause a networking device to:

obtain a routing table comprising a plurality of prefix lengths, wherein a respective entry in the routing table specifies a prefix length and a distribution of address entries corresponding to the specified prefix length;

determining a number of hash tables predefined by an administrator;

identify, from the plurality of prefix lengths in the routing table, a subset of prefix lengths having highest distributions of address entries based on the predefined number of hash tables, wherein a number of identified prefix lengths in the subset equals the number of predefined hash tables;

generate a set of hash tables based on the identified subset of prefix lengths with each hash table generated for an identified prefix length in the subset, wherein generating a hash table specific to an identified prefix length comprises allocating a number of hash table entries that support a total number of address entries corresponding to the identified prefix length;

store the generated set of hash tables in a random access memory;

modify the routing table by removing address entries corresponding to the identified subset of prefix lengths from the routing table; and store the modified routing table in a ternary content address memory (TCAM).

10. The non-transitory machine-readable storage medium of claim 9, wherein to generate a hash table based on an identified prefix length comprises instructions that when executed by the processing resource causes the networking device to:

group entries associated with the identified prefix length into the hash table.

11. The non-transitory machine-readable storage medium of claim 9, wherein the distribution of address entries corresponding to the specified prefix length comprises a percentage value.

12. The non-transitory machine-readable storage medium of claim 9, wherein the networking device is to search the hash table prior to searching the modified routing table.

* * * * *